March 13, 1934.  G. W. CLARVOE  1,950,484
PIPE WRAPPING TESTER
Filed May 7, 1932  2 Sheets-Sheet 1
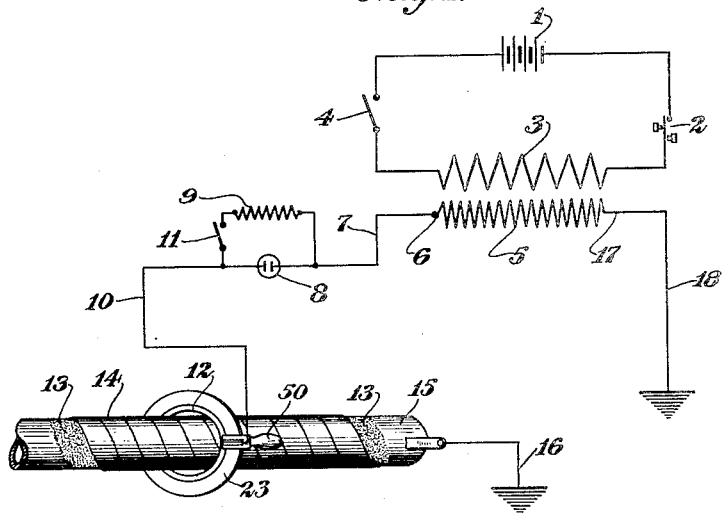
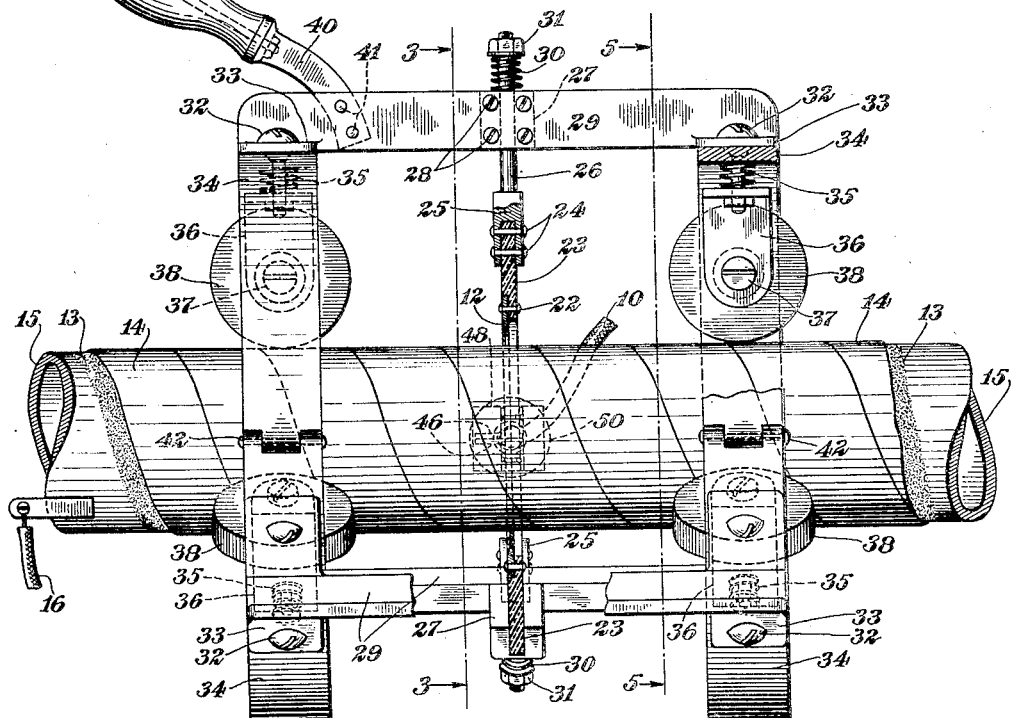
INVENTOR
*George W. Clarvoe.*
BY
*D. N. Halstead*
ATTORNEY March 13, 1934.  G. W. CLARVOE  1,950,484
PIPE WRAPPING TESTER
Filed May 7, 1932   2 Sheets-Sheet 2
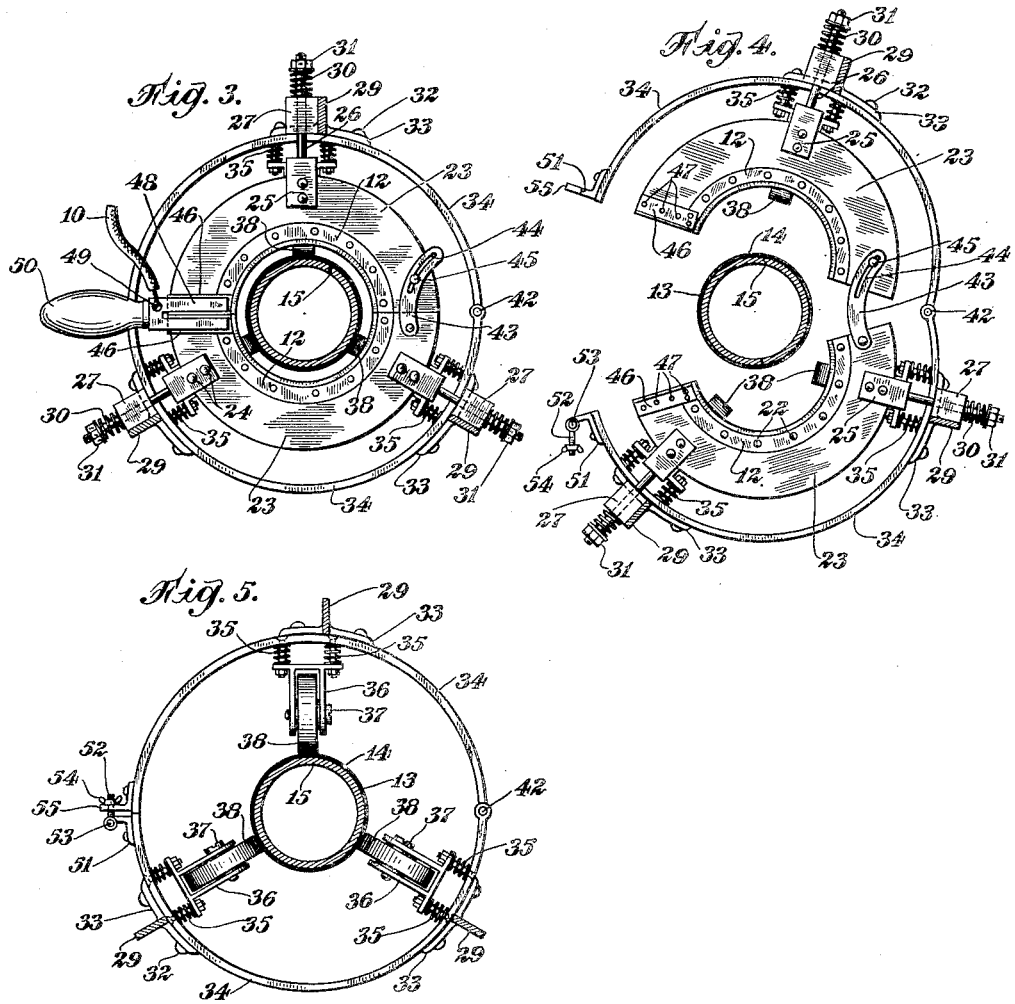
INVENTOR
George W. Clarvoe.
BY D. N. Halstead
ATTORNEY Patented Mar. 13, 1934

1,950,484

UNITED STATES PATENT OFFICE 1,950,484

PIPE WRAPPING TESTER

George W. Clarvoe, Somerville, N. J., assignor to Johns-Manville Corporation, New York, N. Y., a corporation of New York Application May 7, 1932, Serial No. 609,819

7 Claims. (Cl. 175—183)

This invention relates to a device and method for testing non-conductive material for flaws or positions of dielectric weakness. The invention relates especially to method and means of testing for positions of dielectric weakness in non-conducting covering of conductive pipes or other articles of tubular or circular cross section.

In one embodiment of the invention, two conductive members are placed on opposite sides of the non-conductive material to be tested and a high potential difference is created between the conductive members. One of the members is spaced away from the non-conductive material being tested. Means may be provided for indicating conspicuously the passage of a current through the non-conductive element.

The invention may be illustrated in connection with the testing of pipe covering materials.

There has recently been considerable activity in the field of covering pipes, such as natural gas or petroleum pipe lines, with materials to prevent corrosion of the pipe. Thus a pipe line, before being buried, may be coated with a corrosion-proof material, such as a viscous bituminous composition, and then wrapped with prepared roofing paper or the like.

The corrosion-proof material is frequently an asphalt composition rendered somewhat fluid for application to the pipe, as, for example, by warming, by the presence of a small amount of volatile solvent, and/or by emulsification.

After the corrosion-proof coating and wrapping are applied, it is important to know whether the coating contains flaws or pin holes, which may permit of access of ground water or other corrosive agents to the pipe. Such flaws are particularly undesirable in the corrosion-proof coating which lies under the wrapping paper. They may be due to imperfect coating initially or to injury to the undercoating during the wrapping process. Also, it is important at times to test a pipe line which has been buried for some time and which is suspected of having developed flaws which are not apparent on the surface. It is important, therefore, that the method of testing should reveal concealed flaws.

Electric testing devices have been previously used for testing for flaws in non-conductive material Such testing devices usually include an electrode placed against one face of the non-conducting material and another conductive member or electrode placed against the opposite face of the material. Since the two electrodes are adjacent to opposite faces of the material undergoing test, a moderate different of potential between the two electrodes is used.

An electric testing device has been used for the detection of flaws in the corrosion-proof covering of pipe lines. For this purpose, there has been used a method that involves filling the flaws with an aqueous solution of an electrolyte, such as salt, and observing the flow of electricity therethrough. The apparatus used may comprise a source of moderate voltage, an electrode contacting with an electrolyte solution applied to the non-conductive covering of the pipe, as, for example, a rag or sponge saturated with the solution and attached to one pole of the source of voltage, and a connection between the pipe and the other pole of the source of the electric voltage. When the salt solution contacts with a portion of the covering which contains a pin hole or flaw extending through the covering, the salt solution flows into the pin hole or flaw and completes the electric circuit with a consequent flow of current. To this method there are several disadvantages. First, it is inconvenient, as, for example, to the extent that such testing of a large pipe usually requires that a man should walk or tramp at intervals upon the surface of the covering being tested. Also, there is the need of mopping the pipe covering over its entire area with a salt solution. This may leave on the pipe some salt or other electrolyte, the corrosive influence of which is substantial. Furthermore, certain areas of the pipe may be inadvertently not tested.

It is an object of the present invention to provide a device and method of testing non-conductive covering of a conductive member that is reliable, convenient, and without injury to the covering. It is a further object to provide a portable device and a method in which a testing electrode may be moved rapidly along the surface of the covering of a pipe in spaced relationship thereto. A further object is to make the test with a voltage sufficiently high to show flaws that may extend only partially through the covering, as, for example, through only the bituminous undercoating in an assembly comprising an impregnated paper wrapped around such undercoating. A further object is to provde, if desired, an indicator adapted to show the passage of electric current through a flaw or position of dielectric weakness in the non-conductive covering and also to indicate at all times whether the apparatus is in good working order. Other objects and advantages will appear as the description of the invention progresses.

A preferred embodiment of the invention is illustrated in the appended drawings in which, Fig. 1 shows diagrammatically the electrical connections and arrangement.

Fig. 2 shows a side elevation of the testing apparatus in position around a pipe covered with non-conductive material undergoing test.

Fig. 3 is a cross sectional view along the line 3—3 of Fig. 2, in the direction of the arrows.

Fig. 4 is a cross sectional view similar to Fig. 3, but showing the apparatus in open position suitable for placing around or removing from a tubular object that is to be submitted to test.

Fig. 5 is a cross sectional view along the line 5—5 in Fig. 2 in the direction of the arrows.

In the various figures like reference characters denote like parts.

Thus 1 denotes a source of electric energy, such as a battery of four standard dry cells joined in series. This source of energy, in this case direct current, is joined in series to an interrupter 2, which may be of the vibrating reed or other conventional type, to the primary circuit 3 of an induction coil, and to a switch 4. Spaced near the primary coil and co-acting therewith as an induction coil, to provide a source of very high voltage, is the secondary coil 5 with the poles or terminals 6 and 17 respectively. The terminal 6 is connected in series, by a conductive connection 7, to means 8 for indicating the passage of a very small electric current, advantageously a lamp comprising a bulb containing an inert gas of the helium group of elements, such as a 110 or 220 volt neon or argon glow lamp, and, by conductive connection 10, to a conductive element or narrow ring electrode 12. The electrode is adjacent to, in this case surrounds, in spaced relationship, the corrosion-proof coating 13 and the outer wrapping 14 of the conductive member 15, which, in the illustration, is an iron or steel pipe. The member 15 is provided with a conductive connection 16 to the ground. The other pole 17 of the secondary circuit of the induction coil is provided also with a conductive connection 18 to the ground, whereby the conductive member is connected indirectly to that pole 17 of the source of high voltage that is not joined to the indicating means and the electrode.

The arrangement illustrated provides a complete electric circuit, except for the resistance offered by the air space between the electrode 12 and the wrapping material 14, and the resistance offered also by the wrapping material 14 and the corrosion-proof coating 13. A resistance 9 may be provided in parallel with the indicator 8, and in a circuit provided with a switch 11. This resistance 9 may be used to modify, as and if desired, the amount of current that passes through the indicator.

When a ring electrode is used in testing for dielectric weakness in non-conductive covering of a pipe, the electrode is placed adjacent to and maintained in spaced relationship to the covering. The electrode is attached to means for moving the electrode along the non-conductive covering, in spaced relationship thereto. The ring may be attached, for example, as by rivets 22, to a non-conducting ring 23, which in turn may be secured by rivets 24 within a forked member 25. The member 25 may be integral with or united to a rod 26 that passes through a bushing 27 secured by fastening members, such as screws 28, to a supporting bar 29. The rod 26, after passing through the bushing, may pass also through a coiled spring 30 above which the rod is secured by the nut 31. The spring serves the purpose of giving an adjustable mounting of the electrode 12.

The supporting bar 29 is a part of a carriage which may be moved along the pipe 15 in such manner as to maintain the electrode 12 in spaced relationship to the covering undergoing test. The carriage may comprise a plurality, say three or more, of these bars supported at either end by non-conductive supports. Thus, such a bar may be attached at either end by means of a screw 32 passing through a flange 33 and into a supporting ring 34. The same screw or fastener 32 may then pass through an automatic adjusting member such as a coil spring 35 which serves as a miniature shock absorber for the fork 36, which is provided with an axle 37 carrying the supports or wheel 38. The support 38 is suitably of non-conductive material, is insulated from the electrode, or is otherwise adapted to prevent the flow of electric current from the electrode through the support to the covering. As the carriage is advanced, the support moves along the surface of the covering undergoing test. The support or wheel 38 may consist of a phenol-aldehyde condensation product (Bakelite) or hard rubber, for example, and should have a width of rim such as to minimize the wheels cutting into the material undergoing test.

The carriage may be advanced along the pipe manually, as by means of the insulating handle 39 attached through a rod 40, and rivets 41, to that one of the bars 29 that, during use of the tester, is most accessible to the operator, say the bar on the upper side of the pipe.

When it is desired to remove the tester from a pipe or to bring it into position with the electrode around a pipe, the apparatus may be opened like a clam shell on the hinge 42, which is provided in each of the rings 34 which support the several bars of the carriage at both ends. This opening makes desirable that the electrode or ring 12 may part, in two halves. At the edges of the two halves of the electrode that are adjacent to the hinge 42, there may be provided a curved bar 43 attached at one end to an edge portion of the electrode and provided at the other end with a slot 44 engaging pin 45 attached to the other edge of the electrode. The other edges of the two halves of the electrode may be provided with closing means, as with angle bars 46 attached, by means of rivets 47, to the electrode. These angle bars may be held together, when the ring is closed, by means of a notched bar 48, to which may be attached the conductive connection 10 by means of the screw 49. To this notched or grooved bar there may be attached an insulating handle 50 for convenience in slipping the grooved bar over or away from the angles.

When the ring structure is closed the outer rings which support the carriage may be held together, as illustrated in Fig. 5, by means of lug 51, bolt 52 pivotally attached at position 53 and provided with wing nut 54, and lug 55. Lug 55 may be provided with a groove (not shown in the figure) to engage the bolt 52.

The method of using a testing device of the class described will be further illustrated in connection with a wrapped pipe line.

An iron pipe line that is partly buried or otherwise grounded is coated with a melted or softened bituminous composition, to give the layer 13, which may be, for example, 0.05 to 0.25 inch thick. After this bituminous coating has sufficiently hardened over the outer surface, the testing device is passed along the coating. When the pipe line is being continuously coated, testing may be made at a distance behind the coating machine, say at a distance behind that corresponds to the amount of pipe being coated in two minutes. Or, the testing device may be made a part of the coating machine at a predetermined distance. The testing may be repeated after the covering is completed, as by wrapping the said coating with prepared roofing paper.

The electrode 12 is of size selected for the pipe line and is of such size that the electrode is spaced away from the covering. Thus there may be a space of ¼ to 1 inch between the electrode and the exposed side of the pipe covering. There has been used to advantage a spacing in which the nearest point on the electrode is approximately ½ inch from the nearest point of the non-conductive coating or wrapping being tested.

The secondary coil of the induction apparatus or other source of very high voltage, say 40,000 volts or more, suitably 75,000 to 100,000 volts, is connected at one pole 6, suitably through current indicating means 8, to the electrode. The other pole 17 of the secondary coil or source of very high voltage is grounded.

When the electrode is not adjacent to a position of dielectric weakness, such as a pin hole in the bituminous coating of the pipe, there will not be a complete circuit in the usual sense of the word and there will be no sparks passing. However, with such voltage as indicated and if the neon lamp used as indicating means, there will be sufficient corona discharge to cause the neon lamp to glow slightly in the neighborhood of the electrodes within the enclosing glass bulb, unless there is some abnormal condition in the testing machine, such as a broken connection. This slight glowing of the lamp is a feature of advantage, as it indicates at all times whether or not the testing device is in working order.

The spacing of the electrode 12 away from the non-conductive material undergoing test makes possible the clearing of irregularities of surface of the material by the electrode, prevents the electrode from disturbing a surface that is not sufficiently firm to permit contact with the moving electrode, minimizes difficulties due to the presence of moisture, say in the form of dew on the surface of the pipe undergoing test, and prevents fouling of the electrode by the material being tested. The fact that so little current is required makes possible that the testing device and its source of current may be portable and used in localities remote from electric lines.

The wrapping paper or covering 14 conceals from view flaws in the undercoating. However, the high voltage which the improved testing device utilizes, makes possible the detection of such flaws, even though they do not extend through the wrapping paper and exist only in the undercoating. The dielectric strength of the wrapping paper is so slight in comparison with the resistance required to prevent passage of the sparks from the electrode to the pipe, that sparks will pass directly through the wrapping paper to a flaw in the undercoating.

When the passage of a current through a flaw is indicated, the operator may quickly stop the movement of the testing device along the pipe and may locate accurately the position of sparking. This shows the point that needs repairing. He may then mark the point in any suitable manner so that, after the testing device has moved on, another operator can spot that point with some bituminous patching material after the wrapping material has been removed, if necessary. The fact that the bituminous coating does not need to be entirely cool before being tested by the spaced away electrode makes possible the patching of the coating while it is still somewhat warm and adapted to weld the patching material applied thereto into a more or less homogeneous coating.

The details that have been given are for the purpose of illustration and not restriction of the invention. Many modifications and variations from the details may be made without departing from the scope of the invention. It is intended, therefore, that the invention should be limited only by the terms of the claims.

What I claim is:

1. A device for locating a position of dielectric weakness in a non-conductive material which comprises a source of very high voltage, a narrow electrode on one side of the conductive material and adjacent thereto, a conductive member on the other side of the non-conductive material, a conductive connection joining a pole of the source of high voltage and the electrode, a conductive connection between the other pole of the source of high voltage and the said conductive member, whereby a current is caused to pass through a position of dielectric weakness in the non-conductive material when the electrode is near the said position of weakness, and means for supporting the said electrode movably and in spaced relationship upon the said non-conductive material.

2. A device for locating a position of dielectric weakness in a non-conductive material which comprises a source of very high voltage, means for indicating the passage of a current, a narrow electrode on one side of the conductive material and in spaced relationship thereto, a conductive member on the other side of the non-conductive material, a conductive connection joining a pole of the source of high voltage, the indicating means, and the electrode, a conductive connection between the other pole of the source of high voltage and the said conductive member, whereby a current is caused to pass through a position of dielectric weakness in the non-conductive material when the electrode is near the said position of weakness, and means for supporting the said electrode movably and in spaced relationship upon the said non-conductive material.

3. A device for locating a position of dielectric weakness in a non-conductive material which comprises a source of very high voltage, means comprising a neon glow lamp adapted to be operated by relatively low voltage electricity or the like for indicating the passage of a current, an electrode on one side of the conductive material and in spaced relationship thereto, a conductive member on the other side of the non-conductive material, a conductive connection joining in series a pole of the source of high voltage, the indicating means, and the electrode, and a conductive connection between the other pole of the source of high voltage and the said conductive member, whereby a current is caused to pass through a position of dielectric weakness in the non-conductive material when the electrode is near the said poistion of weakness.

4. A device adapted for locating positions of dielectric weakness in non-conductive covering of conductive pipes, said device comprising an electrode disposed adjacent to the non-conductive covering in spaced relationship thereto and maintained at a very high potential with respect to the pipe, and means for moving the electrode along the covering while maintaining the electrode at the said high potential and in spaced relationship to the covering.

5. A device adapted for locating positions of dielectric weakness in non-conductive covering of conductive pipes, said device comprising a ring electrode, disposed around the non-conductive covering in spaced relationship thereto and maintained at a very high potential with respect to the pipe, and means for moving the electrode along the covering while maintaining the electrode at the said high potential and in spaced relationship to the covering, said means comprising a carriage that is mounted upon supports that are adapted to prevent the flow of current from the electrode through the supports to the covering.

6. A device adapted for locating positions of dielectric weakness in non-conductive covering of conductive pipes, said device comprising a ring electrode disposed around the non-conductive covering in spaced relationship thereto and maintained at a very high potential with respect to the pipe, an indicator for showing the passage of current from the electrode to the pipe, and means for moving the electrode along the covering while maintaining the electrode at a high potential in spaced relationship to the covering.

7. A device adapted for locating positions of dielectric weakness in non-conductive covering of conductive pipes, said device comprising a ring electrode disposed around the non-conductive covering in spaced relationship thereto and maintained at a very high potential with respect to the pipe, means for moving the electrode along the covering while maintaining the electrode at a high potential and in spaced relationship to the covering, and an indicator comprising a gas-containing glow lamp or the like for showing the passage of current from the electrode to the pipe, said indicator being sensitive to corona discharge and adapted to show at all times whether or not the device is in working order.

GEORGE W. CLARVOE.